(12) United States Patent
Caillet (10) Patent No.: US 6,503,052 B1
(45) Date of Patent: Jan. 7, 2003

(54) INTEGRATED REGULATING BLEED DEVICE FOR A STEAM TURBINE

(75) Inventor: Jacques Caillet, Paris (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/647,892

(22) PCT Filed: Feb. 3, 2000

(86) PCT No.: PCT/FR00/00256
§ 371 (c)(1),
(2), (4) Date: Jan. 3, 2001

(87) PCT Pub. No.: WO00/47921
PCT Pub. Date: Aug. 17, 2000

(30) Foreign Application Priority Data

Feb. 8, 1999 (FR) ............................................ 99 01589

(51) Int. Cl.$^7$ ............................................... F04D 29/56
(52) U.S. Cl. ....................................... 415/159; 415/185
(58) Field of Search ................................. 415/159, 157, 415/185

(56) References Cited

U.S. PATENT DOCUMENTS

| | | | |
|---|---|---|---|
| 2,565,178 A | | 8/1951 | Imbert |
| 4,261,685 A | * | 4/1981 | Egli et al. .................... 415/157 |
| 5,409,351 A | | 4/1995 | Geist |

FOREIGN PATENT DOCUMENTS

| | | |
|---|---|---|
| CH | 430 755 | 8/1997 |
| DE | 1 550 406 | 11/1969 |
| DE | 44 25 344 A1 | 1/1996 |

OTHER PUBLICATIONS

Patent Abstracts of Japan, vol. 006, No. 069 (M0125) Apr. 30 1982 corresponding to JP 57 009365 A (Toshiba Corp) dated Jan. 18, 1982.

* cited by examiner

Primary Examiner—Edward K. Look
Assistant Examiner—James M McAleenan
(74) Attorney, Agent, or Firm—Sughrue Mion, PLLC (57) ABSTRACT

An integrated bleed regulator system adapted to be fitted to a steam turbine, the system including a fixed part resembling a diaphragm and has a downstream part including distributor blades between an inner ring and an outer ring. A moving part is provided upstream of the fixed part and constitutes a regulator disk having distributor blades between an inner ring and an outer ring. The disk, according to its annular position, totally or partially obstructs a steam passage in the upstream to downstream direction or does not obstruct it at all and the surface of the regulator disk downstream of the inner and outer rings is at an upstream pressure (P1). A passage is also provided so that at least part of an upstream surface of the assembly formed by the inner and outer rings communicates with a space downstream of an upstream part of the distributor blades at a pressure (P2).

8 Claims, 8 Drawing Sheets

INTEGRATED REGULATING BLEED DEVICE FOR A STEAM TURBINE

BACKGROUND OF THE INVENTION

The invention relates to the field of steam turbines.

To be more precise, the invention relates to a system intended to be fitted to steam turbines of the type referred to as controlled extraction steam turbines, commonly called controlled bleed steam turbines.

Turbines of the type referred to are encountered in many industrial processes combining generation of electrical power and regulation of the pressure in a steam network. A steam network is fed by bleeding steam from the expansion stage of the turbine. To this end, a bleed control unit controls the extraction pressure, which can be measured, in order to regulate it, either in the vicinity of the control unit or at a relatively distant point in the network.

In the prior art, the bleed control units are of different types to suit the type of turbine and in particular can consist of a control valve or a gate valve.

The control valve is external to the steam flow and operates like a standard control valve. Although in theory it does not have any limitation restricting the extraction pressure, it nevertheless has the drawback of requiring a space for installing it which is of considerable length in the axial direction, generating non-negligible head losses.

Figure 1:
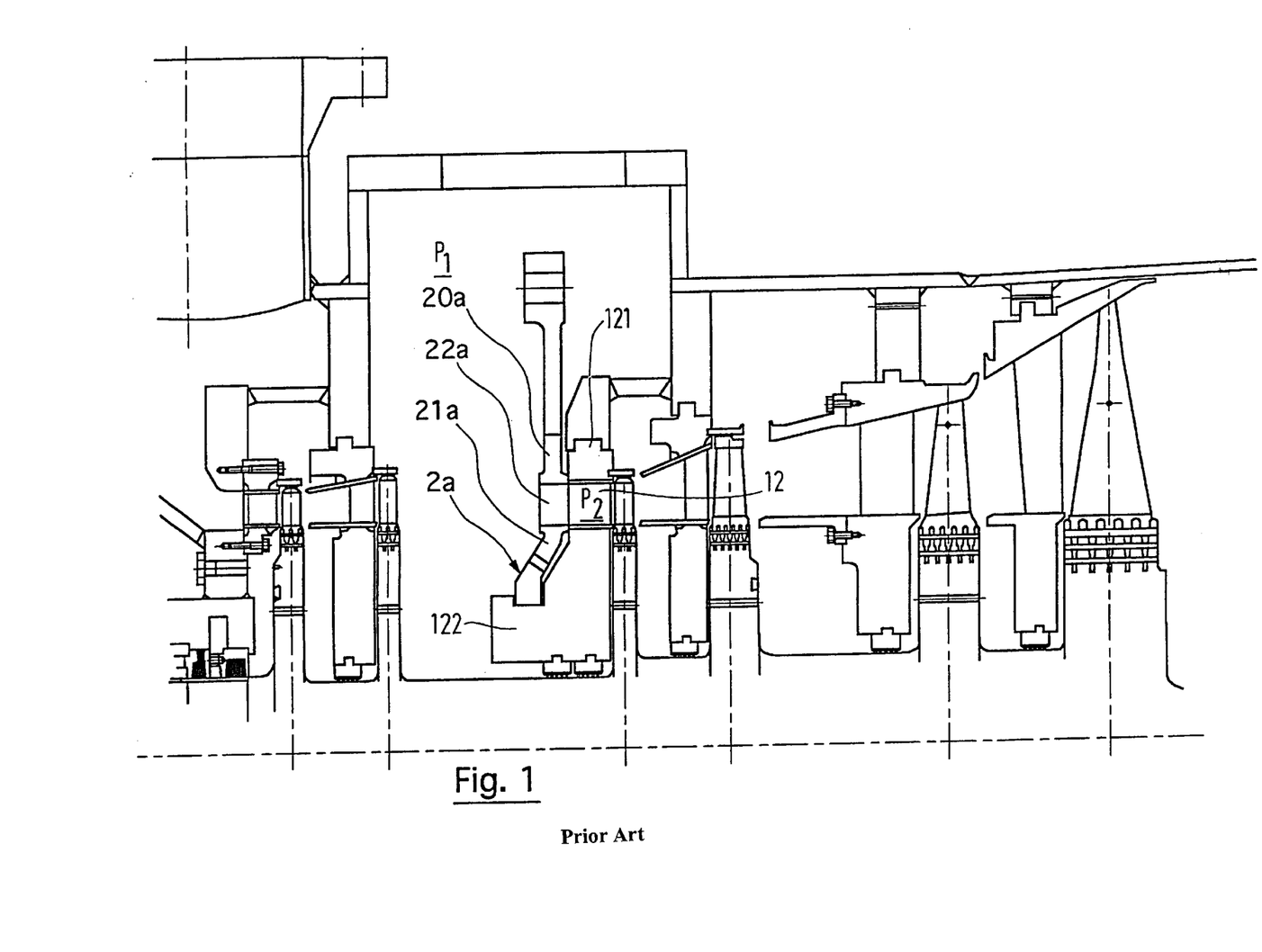
FIGS. 1–4 represent a gate valve configuration according to the prior art.

The gate valve has a fixed part and a rotary part. It is inserted between two successive stages of the turbine. Referring to FIG. 1, which shows a gate valve, the rotary part (regulator disk) $2a$ is made up of two concentric rings, namely an inner ring $21a$ and an outer ring $20a$, with the upstream part of the distributor blades $22a$ between them. The fixed part resembles a diaphragm but carries only the downstream part 12 of the distributor blades, between an outer ring 121 and an inner ring 122. When fully open, the gate valve resembles a standard diaphragm. This configuration is shown in the developed sections of the gate valve distributor blades represented in FIG. 2 (fully open), FIG. 3 (partly open) and FIG. 4 (fully closed). The arrow $\underline{f}$ shows the direction of the steam.

If P1 is the upstream pressure (see FIG. 1) and P2 the downstream pressure in the steam flow behind the regulator disk $2a$, only the downstream (rear) face of the blades $22a$ is exposed to the downstream pressure P2 and all the rest of the rear face and the front face (upstream face) of the regulator disk $2a$ are exposed to the upstream pressure P1.

Figure 2:
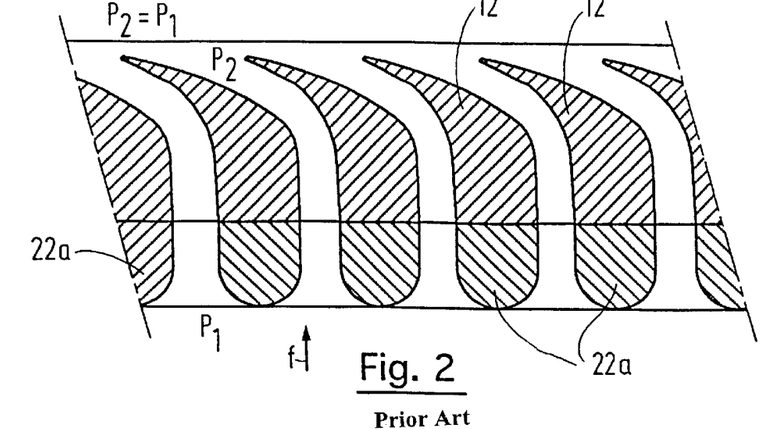
Figure 3:
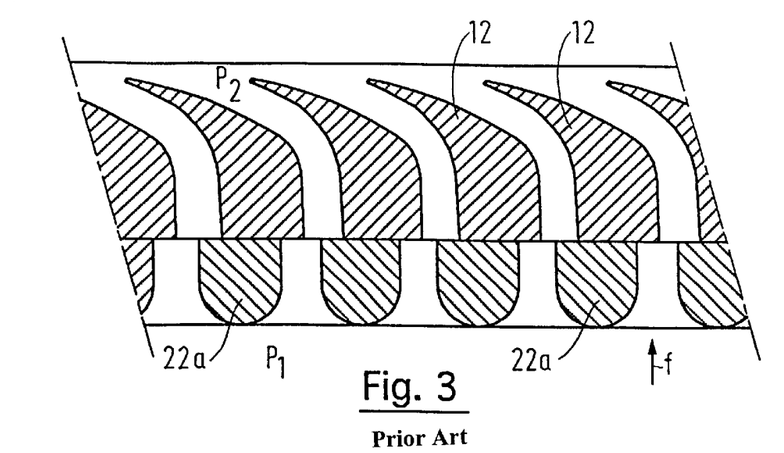

When the disk $2a$ is fully open, as shown in FIG. 2, the upstream and downstream pressures are the same and it is to this pressure that the downstream face of the blades $22a$ is exposed, even though it is in contact with the fixed blades 12. However, if the steam flow is slightly obstructed (FIG. 3) head losses are produced and the downstream pressure P2 is lower than the upstream pressure P1, which presses the regulator disk against the fixed part of the gate valve. This is particularly important in the fully closed situation (FIG. 4) in which the downstream pressure P2 is the condenser pressure, for example.

Accordingly, a bleed regulation system of the above kind has the major drawback of being limited to an extraction pressure of approximately 10 to 12 bars. This is because, in the current configuration shown in FIG. 1, the pressure forces acting on the regulator disk $2a$ are absorbed by the rubbing surfaces between it and the fixed part, rotation inducing unacceptable specific pressures therein if the extraction pressure becomes too high.

SUMMARY OF THE INVENTION

An intention of the present invention is to alleviate some of the drawbacks of the prior art.

The invention accordingly provides an integrated bleed regulator system adapted to be fitted to a steam turbine, the system including a fixed part resembling a diaphragm and including a downstream part of distributor blades between an inner ring and an outer ring and a moving part upstream of said fixed part and constituting a regulator disk comprising an upstream part of said distributor blades between an inner ring and an outer ring, in which system said disk, according to its angular position, totally or partially obstructs the steam passage in the upstream to downstream direction or does not obstruct it at all and the surface of said regulator disk downstream of said inner and outer rings is at the upstream pressure, which system is characterized in that means are provided so that at least part of an upstream surface of the assembly formed by the inner and outer rings of the regulator disk communicates with a space downstream of an upstream part of the distributor blades where the pressure is the downstream pressure.

In one embodiment of the invention said means include at least one part forming a counter-abutment with at least a part of the upstream surface of the assembly formed by the inner and outer rings of said regulator disk with a small operating clearance, said regulator disk includes at least one annular groove open on the side facing said counter-abutment part, and at least one passage connects said groove to the space downstream of said upstream part of said distributor blades of the regulator disk where the pressure is the downstream pressure.

According to another feature of the invention said passage opens into a downstream well on the downstream side of said upstream part of the distributor blades of the regulator disk.

Thus, in the invention, it is possible to increase the maximum pressure up to which the steam bleed regulator system can operate correctly.

What is more, the invention involves only a slight increase in overall size compared to a standard gate valve.

In a first embodiment of the invention said counter-abutment part is at the periphery of said fixed part.

In a second embodiment of the invention said counter-abutment part is at the level of the internal bore of said fixed part.

In a third embodiment of the invention said system includes two counter-abutment parts, one of which is at the periphery of said fixed part and the other of which is at the level of the central area thereof.

BRIEF DESCRIPTION OF THE DRAWINGS

Other features and advantages of the invention will become apparent on reading the following description of three preferred embodiments of the invention, which description is given by way of illustrative and non-limiting example only and with reference to the accompanying drawings, in which.

DETAILED DESCRIPTION OF THE INVENTION

A first embodiment 10 of a bleed regulator system according to the invention will now be described with reference to the simplified diagrams of FIGS. 5 and 6.

As a general rule, in the remainder of this description, it is assumed that fluid enters the steam bleed regulator system from the left and leaves it to the right. In other words, the upstream face of the system is the left-hand face of the system and its downstream face is its right-hand face.

In the standard manner, a system 10 for regulating the bleeding off of steam (flowing in the direction indicated by that of the arrow f) has a fixed part 11 which resembles a diaphragm. The fixed part 11 includes only the downstream part 12 of the distributor blades. A diaphragm has a ring structure comprising an outer ring 121 and an inner ring 122.

The downstream part 12 of the distributor blades is fastened to the outer and inner rings 121, 122. The bore of the inner ring 122 is equipped with seals 13 to limit downstream leakage of steam. The periphery of the ring 121 has an exterior shoulder 14 for locating the integral regulator system 10 within the turbine. The system 10 also has a moving part consisting of a regulator disk 15.

Figure 6:
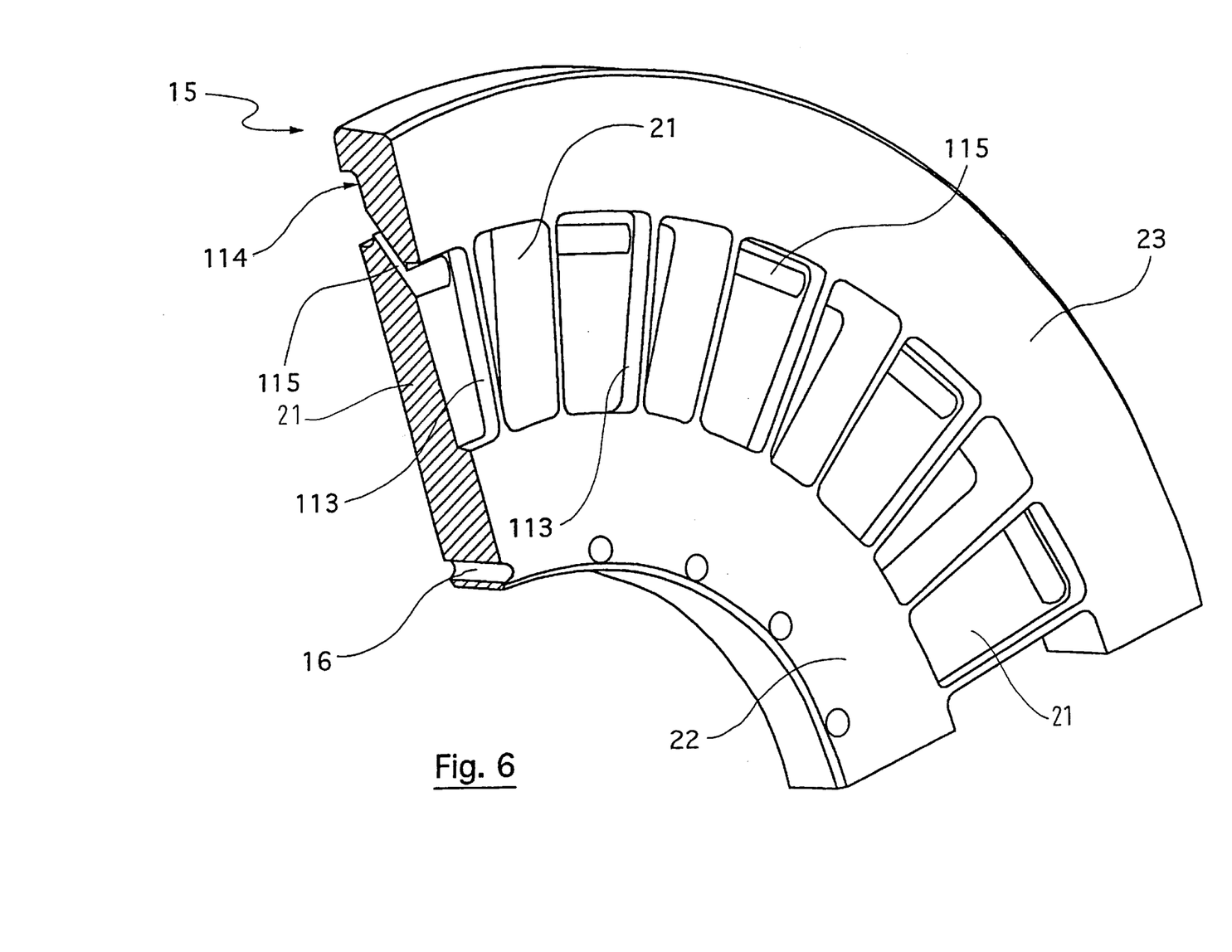
FIG. 6 is a simplified diagrammatic perspective view of one embodiment of a moving part of the system shown in FIG. 5.

The regulator disk 15, part of which is shown in isolation and in perspective in FIG. 6, comprises two concentric rings, namely an inner ring 22 and an outer ring 23, with the upstream part 21 of the distributor blades 12, 21 between them.

The system 10 consisting of the fixed part 11 and the regulator disk 15 constitutes a rotary closure system.

The regulator disk 15 turns about the axis of the machine and is supported by a guide 17 of the fixed part 11. Pressure forces acting in the upstream to downstream direction press the regulator disk 15 onto the fixed part 11, against inner and outer annular rubbing bearing surfaces 18, 19 of the fixed part 11.

Because of pressure balancing holes 16, the pressure acting on the rear face of the inner ring 22 of the regulator disk 15 is the upstream pressure P1.

In accordance with the invention, the pressure acting on at least part of the upstream surface of the combination of the inner and outer rings 22 and 23 of the regulator disk 15 is the pressure P2 of the steam flow downstream of the upstream part 21 of the distributor blades 12, 21, and this partly or totally compensates, or even overcompensates, the force applied to the regulator disk 15 in the upstream to downstream direction because of the pressure difference P1–P2 between the upstream and downstream faces of the upstream part 21 of the distributor blades. The compensation depends on the area over which the downstream pressure P2 acts.

Figure 5:
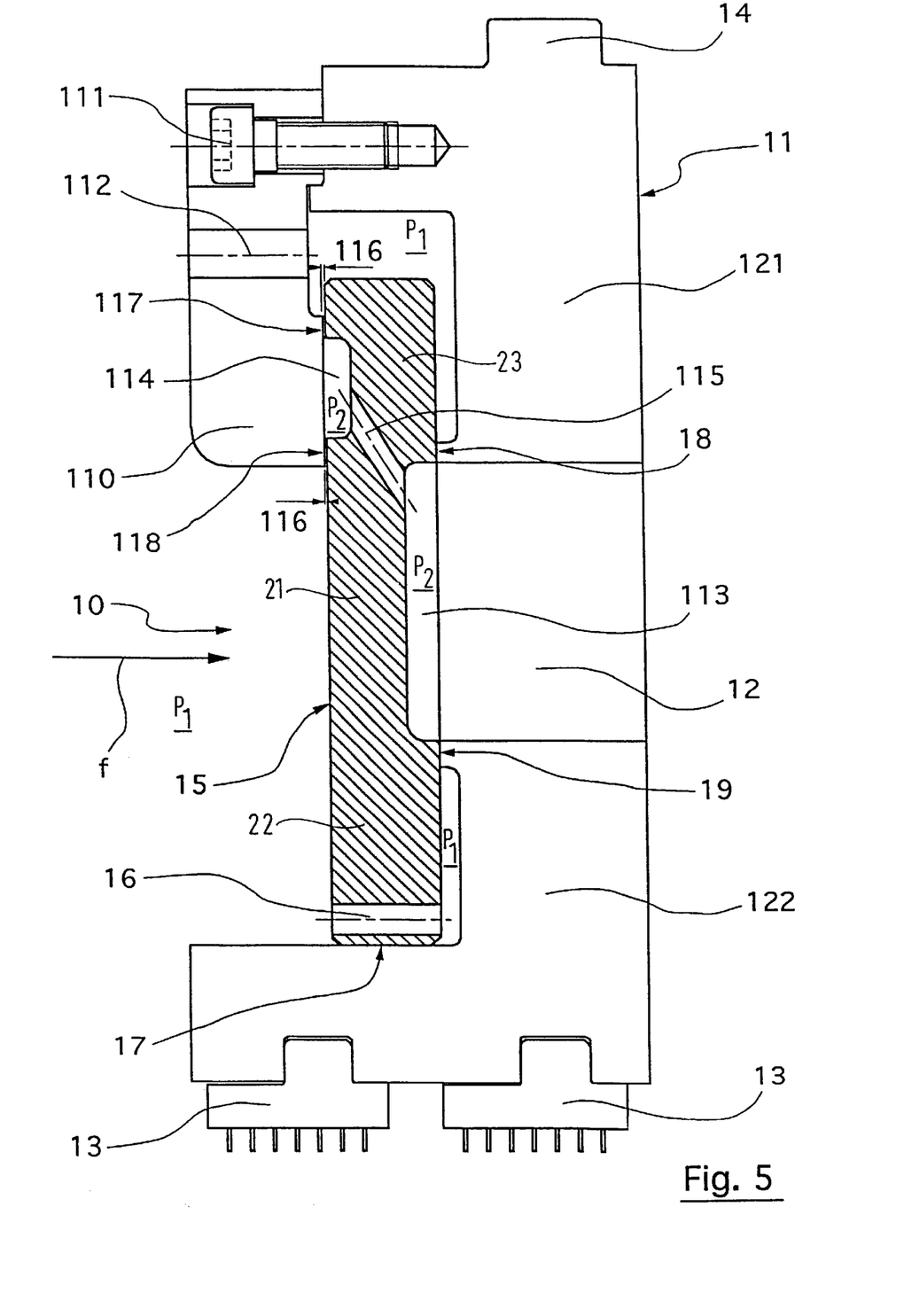
FIG. 5 is a simplified diagrammatic side view of a first embodiment of a steam bleed regulator system of the invention.

To this end, an annular groove 114 on the upstream face of the outer ring 23 of the regulator disk 15 is connected by a passage 115 to the portion of the steam flow downstream of the upstream part 21 of the distributor blades, where the pressure is the pressure P2 (see FIG. 5). The downstream face of the upstream part 21 of the distributor blades advantageously includes a downstream well 113 and the passage 115 terminates in the well 113. The annular groove 114, which is open on the side towards the outside of the outer ring 23, is closed by a part counter-abutment 110 joined to the fixed part 11 and covering part of the upstream face of the outer disk 23, with a small operating clearance 116.

Because of one or more passages 112 in the part 110, the pressure acting on the rear face of the outer ring 23 is the upstream pressure P1. The part 110 is fixed to the fixed part 11 by screws 111. The counter-abutment part 110 "closing" the groove 114 covers the upstream face of the outer ring 23, with the small clearance 116, along outer and inner annular surfaces 117 and 118 with the groove 114 between them.

Figure 4:
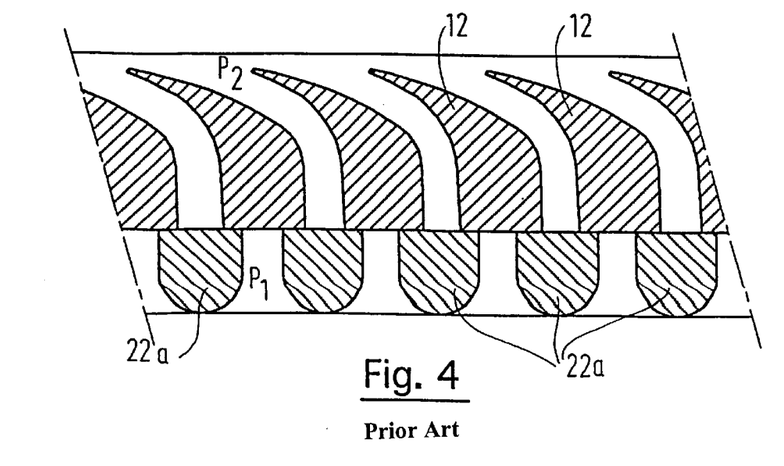

Accordingly, by virtue of the invention, the pressure in the groove 114 is the downstream pressure P2 and the area of the groove 114 can be calculated so that it is less than, equal to or greater than the downstream area of the upstream part 21 of the distributor blades, where the pressure is the downstream pressure P2, which is maximum in the totally closed configuration shown in FIG. 4.

It is therefore possible to compensate partly, or even to overcompensate, the force acting on the disk in the upstream to downstream direction and thereby to relieve the pressure applied by the disk 15 to the bearing surfaces 18, 19. This enables the bleed pressure to be increased.

The small operating clearance 116, which is obviously necessary, generates a permanent fluid leak which is drained via the passages 115. This permanent leak has the advantage of guaranteeing a flow of fluid preventing heating of the stages of the turbine further downstream, independently of the degree of closure of the regulator disk 15.

Figure 7:
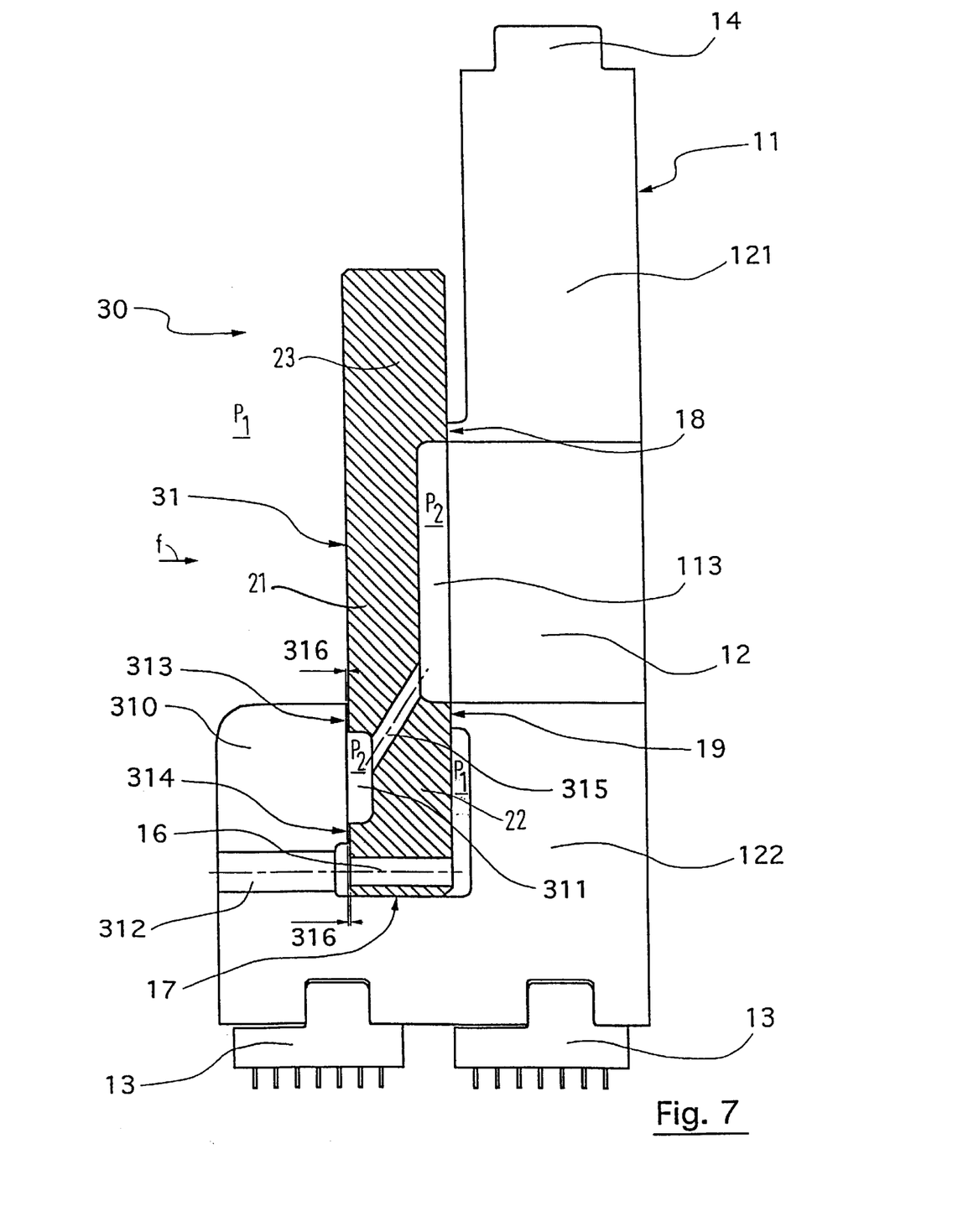
FIG. 7 is a simplified diagrammatic side view of a second embodiment of a system of the invention.
Figure 8:
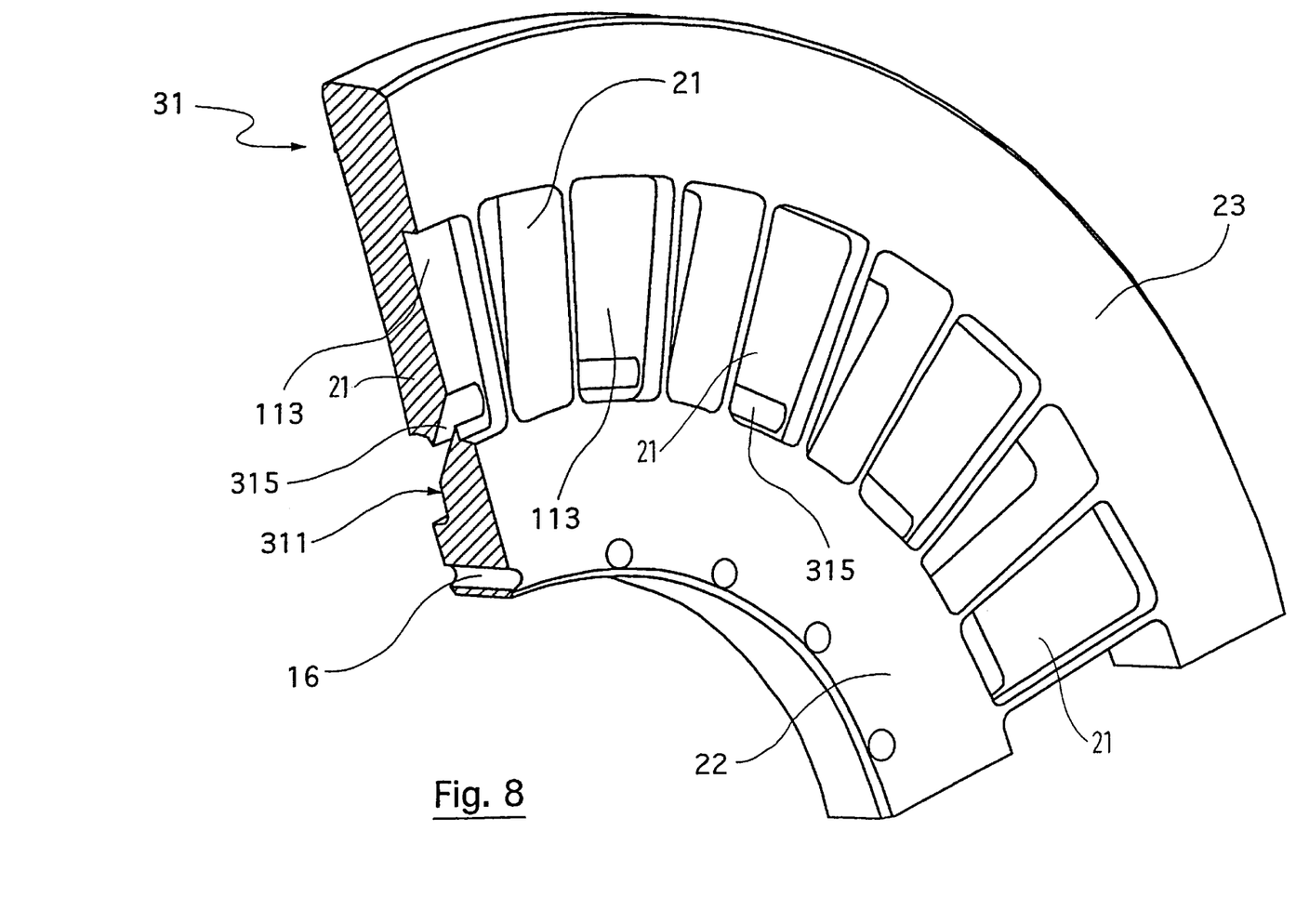
FIG. 8 is a simplified diagrammatic perspective view of one embodiment of a moving part of the system shown in FIG. 7.

A second embodiment 30 of a system according to the invention will now be described with reference to the simplified diagrams of FIGS. 7 and 8.

Components already described with reference to FIG. 5 retain the same reference number. Only aspects thereof specific to this second embodiment are described here.

In this embodiment of the invention, the counter-abutment part 310 is at the level of the guide 17 of the fixed part 11, i.e. at the height of the bore of the moving regulator disk 31. The periphery of the regulator disk 31 is therefore free. In some cases, and in particular when the overall size in the center is small, a maneuvering arm necessary for rotating the regulator disk 31 can even be provided here, for example. The upstream annular groove 311 is therefore located in the central area of the moving regulator disk 31, i.e. on the inner ring 22, and between the outer and inner central annular upstream surfaces 313, 314.

The balancing passages 312 through the counter-abutment part 310 are at substantially the same height as the balancing holes 16 in the inner ring 22 of the regulator disk 31, thereby facilitating exchange of fluid between the upstream side of the counter-abutment part 310 and the downstream side of the inner ring 22.

The clearance 316 is provided between the counter-abutment part 310 and the regulator disk 31 at the height of the outer and inner bottom annular upstream surfaces 313, 314.

The fixed part 11 and the counter-abutment part 310 constitute a single component. Thus no fixing means are needed for fixing these two parts together. The system 30 is quicker to install because this eliminates the step of fixing together the two parts (i.e. the counter-abutment part 310 and the fixed part 11).

Because of the passages 310 through the regulator disk 31 the pressure in the annular groove 311 is the same downstream pressure P2 as the pressure in the downstream wells 113.

The annular groove 311 is on the upstream face of the inner ring 22 of the regulator disk 31.

Figure 9:
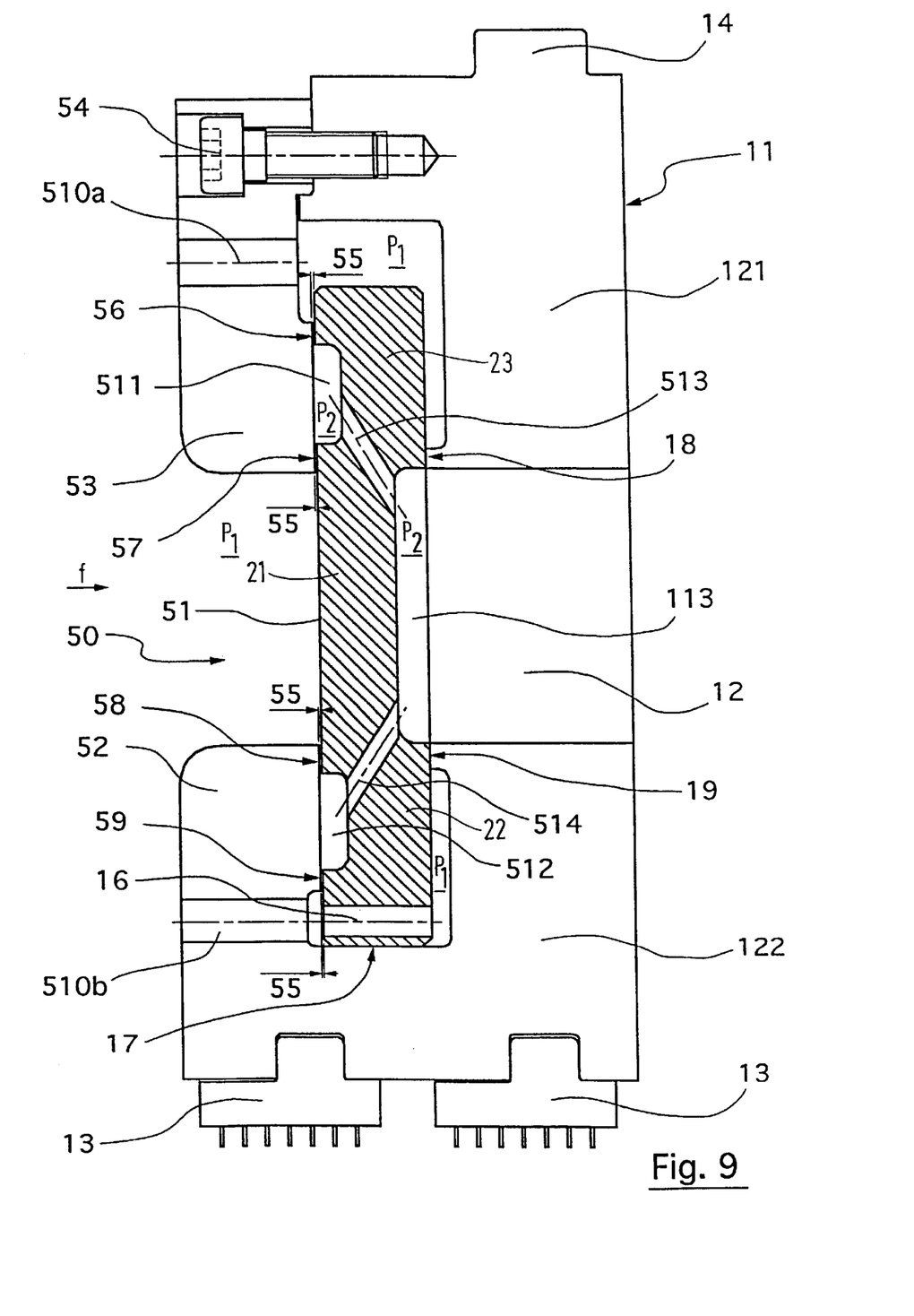
FIG. 9 is a simplified diagrammatic side view of a third embodiment of a system according to the invention.
Figure 10:
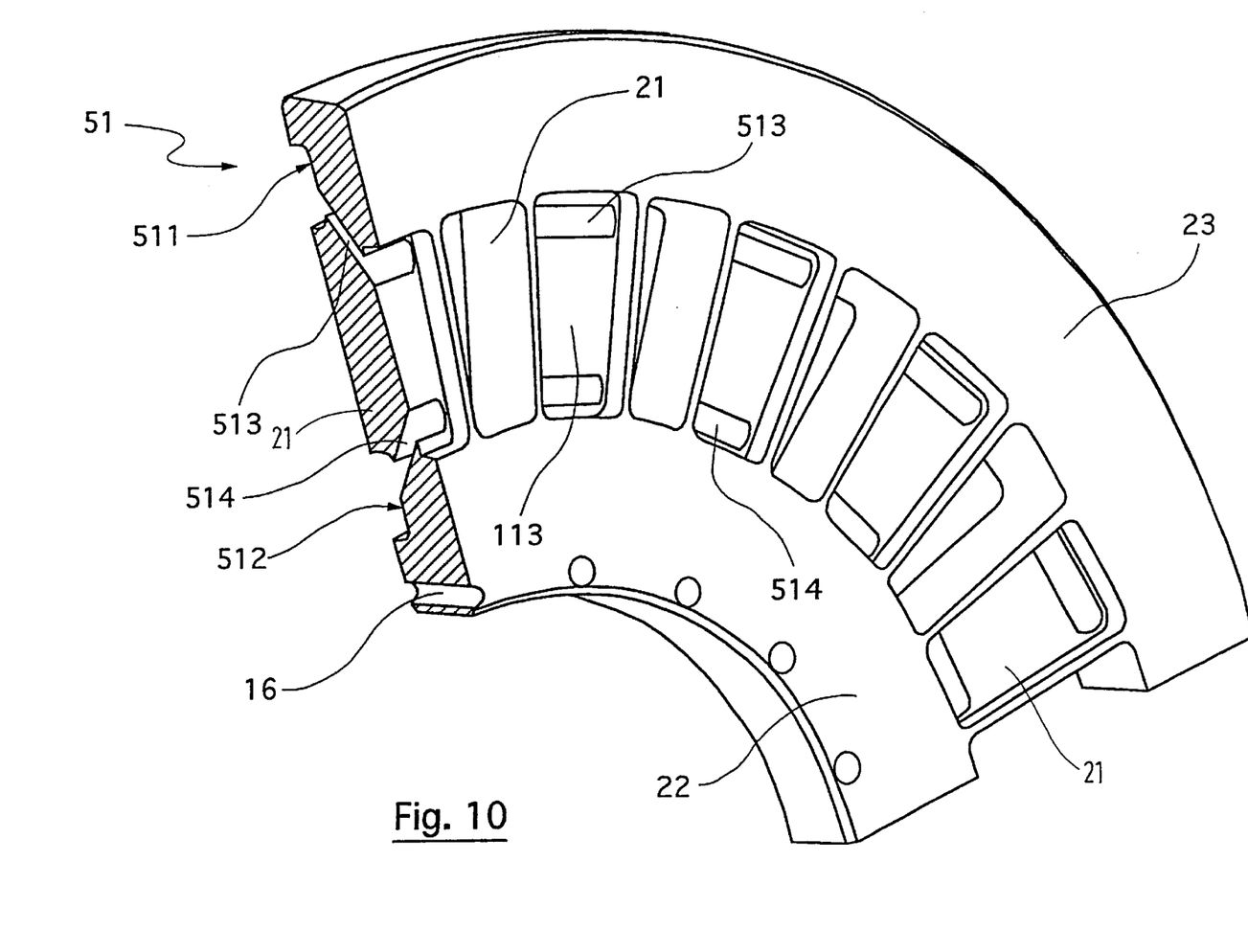
FIG. 10 is a simplified diagrammatic perspective view of one embodiment of a moving part of the system shown in FIG. 9.

A third embodiment 50 of a system according to the invention will now be described with reference to the simplified diagrams of FIGS. 9 and 10.

Components already described with reference to FIG. 5 retain the same reference number. Only their aspects specific to the third embodiment of the invention are described here.

This third embodiment of the invention is a combination of the first and second embodiments of the invention described above.

To be more precise, the bleed regulator system 50 comprises two counter-abutment parts 52, 53. The first counter-abutment part 52, located at the height of the bore of the regulator disk 51, and the part 11 constitute a single component. The second counter-abutment part 53 is fixed to the periphery of the fixed part 11, for example by means of a screw 54. The system 50 can be installed, even if the available space is small, provided that there is the same amount of room at the level of the periphery of the regulator disk 51 and at the level of the bore in the regulator disk.

A bleed regulator system of the above kind has the advantage of enabling substantially equal distribution of pressure forces in the upstream to downstream direction on the inner and outer rings 22 and 23 of the regulator disk 51. Also, the two counter-abutment parts 52, 53 also distribute pressure forces in the downstream to upstream direction on their active faces (i.e. the faces that face toward the regulator disk 51) substantially equally.

A clearance 55 is provided between the two counter-abutment parts 52, 53 and the moving regulator disk 51 at the height of the respective outer and inner annular upstream surfaces 56, 57, 58, 59.

Each counter-abutment part 52, 53 has one or more respective balancing passages 510b, 510a through it.

The outer ring 23 of the regulator disk 51 has on its upstream face an outer annular groove 511 and the inner ring 22 has on its upstream face an inner annular groove 512. The grooves are "closed" by the counter-abutment parts 53, 52, with the essential operating clearance 55. Each of the outer and inner upstream annular grooves 511, 512 communicates with at least one downstream well 113 via at least one centripetal first passage 513 and at least one centrifugal second passage 514.

Accordingly, as in the previous embodiments, the downstream pressure P2 in the downstream wells 113 and on the downstream face of the blade parts 21 of the regulator disk 51 is present in the grooves 511 and 512 and therefore over a portion of the upstream surface of the regulator disk 51.

What is claimed is:

1. An integrated bleed regulator system adapted to be fitted to a steam turbine, the system including:
a fixed part having an outer ring and an inner ring;
first distributor blades positioned between said inner ring and said outer ring;
a moving part disposed upstream of said fixed part, said moving part comprising a rotatable regulator disk having second distributor blades, said second distributor blades having an upstream part, said regulator disk also including an inner ring and an outer ring, said inner ring and said outer ring respectively having upstream and downstream surfaces, where said regulator disk, according to its angular position, totally or partially obstructs a steam passage in the upstream to downstream direction or does not obstruct it at all, and the downstream surfaces of said inner and outer rings are at an upstream pressure (P1); and
communication means which is provided so that at least one of the upstream surfaces of said inner and outer rings communicates through a portion of said regulator disk with a space downstream of said upstream part of said second distributor blades, at a downstream pressure of (P2).

2. The system according to claim 1, wherein said communication means includes at least one part forming a counter-abutment with at least a part of the upstream surface of at least one of said inner and outer rings of said regulator disk, said counter abutment having a small operating clearance, and said regulator disk including at least one annular groove open on a side facing said at least one part forming the counter-abutment and at least one passage formed through said regulator disk, which connects said groove to the space downstream of said upstream part of said second distributor blades, at the downstream pressure (P2).

3. The system according to claim 2, wherein the space on the downstream side of said upstream part of said second distributor blades of the regulator disk is a downstream well.

4. The system according to claim 2, wherein said at least one part forming the counter abutment contains a passage which communicates with at least the downstream surface of said outer ring.

5. The system according to claim 4, further including a pressure regulating hole formed in said inner ring which communicates with the downstream surface of said inner ring.

6. The system according to claim 2, wherein said at least one part forming the counter abutment contains a passage and said inner ring contains a pressure balancing hole, such that the passage of said at least one part forming the counter abutment and the pressure balancing hole communicate with at least a downstream surface of said inner ring.

7. The system according to claim 2, wherein a first counter abutment part and a second counter abutment part are provided, said first counter abutment part has a passageway which communicates with a downstream surface of said outer ring, and said second counter abutment part has a passageway that communicates with the downstream surface of said inner ring through a pressure balancing hole formed in said inner ring.

8. An integrated bleed regulator system adapted to be fitted to a steam turbine, the system including:
a fixed part having an outer ring and an inner ring;
first distributor blades positioned between said inner ring and said outer ring;
a moving part disposed upstream of said fixed part, said moving part comprising a rotatable regulator disk having second distributor blades, said second distributor blades having an upstream part, said regulator disk also including an inner ring and an outer ring, said inner ring and said outer ring respectively having upstream and downstream surfaces, where said regulator disk, according to its angular position, totally or partially obstructs a steam passage in the upstream to downstream direction or does not obstruct it at all, and the downstream surfaces of said inner and outer rings are at an upstream pressure (P1); and at least one part forming a counter-abutment with at least a part of the upstream surface of at least one of said inner and outer rings of said regulator disk, said counter abutment having a small operating clearance, and said regulator disk including at least one annular groove open on a side facing said at least one part forming the counter-abutment and at least one passage formed through said regulator disk, which connects said groove to the space downstream of said upstream part of said second distributor blades, at a downstream pressure (P2).

* * * * *